(12) United States Patent
Patwardhan et al.

(10) Patent No.: US 7,946,232 B2
(45) Date of Patent: May 24, 2011

(54) PLANTER WITH DEPTH ADJUSTMENT MECHANISM

(75) Inventors: Ranjit G. Patwardhan, Hesston, KS (US); Monte J. Rans, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/501,855

(22) Filed: Jul. 13, 2009

(65) Prior Publication Data

US 2011/0005439 A1 Jan. 13, 2011

(51) Int. Cl.
*A01B 49/04* (2006.01)
*A01B 63/16* (2006.01)
*A01C 5/00* (2006.01)
*A01C 7/18* (2006.01)
*A01C 13/00* (2006.01)

(52) U.S. Cl. ............ 111/66; 111/84; 111/135; 111/193; 172/421

(58) Field of Classification Search .......... 111/134–137, 111/190–196, 164, 59, 61–66, 83–86, 88; 172/538, 539, 519, 520, 239, 395, 421, 397, 156, 669, 743; 403/67, 70
See application file for complete search history.

(56) References Cited

U.S. PATENT DOCUMENTS

| | | |
|---|---|---|
| 4,374,500 A | 2/1983 | Westerfield |
| 4,413,685 A | 11/1983 | Gremelspacher et al. |
| 4,594,951 A | 6/1986 | Grataloup |
| 5,081,942 A | 1/1992 | Clark et al. |
| 5,235,922 A | 8/1993 | Deckler |
| 5,427,038 A | 6/1995 | Ege |
| 5,443,125 A | 8/1995 | Clark et al. |
| 5,595,130 A | 1/1997 | Baugher et al. |
| 6,148,747 A | 11/2000 | Deckler et al. |
| 6,983,705 B1 | 1/2006 | Gust |

*Primary Examiner* — Christopher J. Novosad (57) ABSTRACT

A planter row unit has a pair of ground-engaging gauge wheels located in close proximity to opposite sides of a furrow opener of the unit. The depth of penetration of the furrow opener depends upon the vertical position of the gauge wheels relative to the furrow opener. Wheel arms that connect the gauge wheels to the frame of the row unit are operably coupled with a depth adjustment lever through a rigid link that transmits adjusting movement of the depth adjustment lever to the gauge wheels to raise or lower the same. The link is made adjustable in length to provide fine depth adjustment of the unit for calibration purposes or otherwise.

7 Claims, 7 Drawing Sheets

PLANTER WITH DEPTH ADJUSTMENT MECHANISM

TECHNICAL FIELD

This invention relates to seed planters of the type employing equalizing gauge wheel mechanisms and, more particularly, to a way of calibrating the depth adjustment mechanism of such a planter so that the actual running depth of the planter corresponds to the indicated running depth at the depth adjustment lever of the machine.

BACKGROUND AND SUMMARY

Equalizing gauge wheel mechanisms for planters are well known. In such arrangements, a pair of ground-engaging gauge wheels are disposed on opposite, left and right sides of a furrow-forming opener, such as double-disc opener that uses a pair of downwardly and forwardly converging discs. The equalizing mechanism is such that when one of the gauge wheels encounters an obstruction causing the gauge wheel to rise, an equal and opposite reaction is created in the other gauge wheel, causing it to lower by the same amount. Therefore, the furrow opener and its supporting frame rise by only half the usual distance. Notwithstanding this equalizing action, the gauge wheels are height-adjusted by a common depth adjustment mechanism for setting the depth of ground penetration by the furrow opener. It is well known for such depth adjustment mechanisms to utilize a single swingable depth adjustment lever with a handle at its outer end which can be releasably latched in any selected one of a number of fore-and-aft positions corresponding to available depths.

However, with currently available furrow openers, it is possible that even though the depth adjustment levers of different row units on the machine may be set at the same indicated depth, manufacturing tolerances and unequal wear between the various row units may cause the furrow openers to actually operate at slightly different depths. Thus, even though the operator may believe that all seeds are being planted at the same, indicated depth on the multiple row units, in fact they may be planted at different depths, resulting in uneven emergence and other problems.

Accordingly, an important object of the present invention is to provide a way of calibrating a row unit having an equalizer mechanism associated with its gauge wheels so that the indicated running depth corresponds to the actual running depth. As a corollary to the foregoing, it is an important object to provide the user with a way of assuring that when multiple row units of the same machine are all set at a common indicated running depth, the actual running depth is in fact the same for all of the units across the machine.

Pursuant to these objectives, the equalizing gauge wheel mechanism of each row unit is connected to the depth adjustment lever of the unit by a special link that can be slightly adjustably lengthened or shortened as need be while the depth adjustment lever is set at a predetermined indicated depth. By appropriately adjusting the length of the link in this manner, the heights of the gauge wheels of all units relative to their furrow openers, and thus the depth of penetration of the furrow openers into the ground, can be brought into conformity with one another to assure that substantially the same actual depth of furrow opener penetration is achieved across all of the units for the same indicated depth at the depth adjustment levers.

In accordance with the present invention, a planter row unit comprises a frame; a furrow opener carried by the frame; a pair of wheel arms on opposite sides of said furrow opener, each of the wheel arms having an upper end, a lower end, and a pivotal attachment to the frame located intermediate the upper and lower ends for swinging movement about a generally horizontal, transverse axis; a ground-engaging gauge wheel rotatably attached to the lower end of each wheel arm respectively; a transverse equalizer bar interconnecting the upper ends of the wheel arms; a depth adjustment lever pivotally attached to the frame for swinging movement between any selected one of a plurality of predetermined, releasably latched positions; and a link interconnecting the depth adjustment lever and the equalizer bar for adjustably raising and lowering the gauge wheels relative to the furrow opener when the depth adjustment lever is released and shifted between the latched positions whereby to adjust the depth of said furrow opener, the link being selectively adjustable in length to permit depth calibration of the gauge wheels relative to the furrow opener when the depth adjustment lever is in a latched position.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
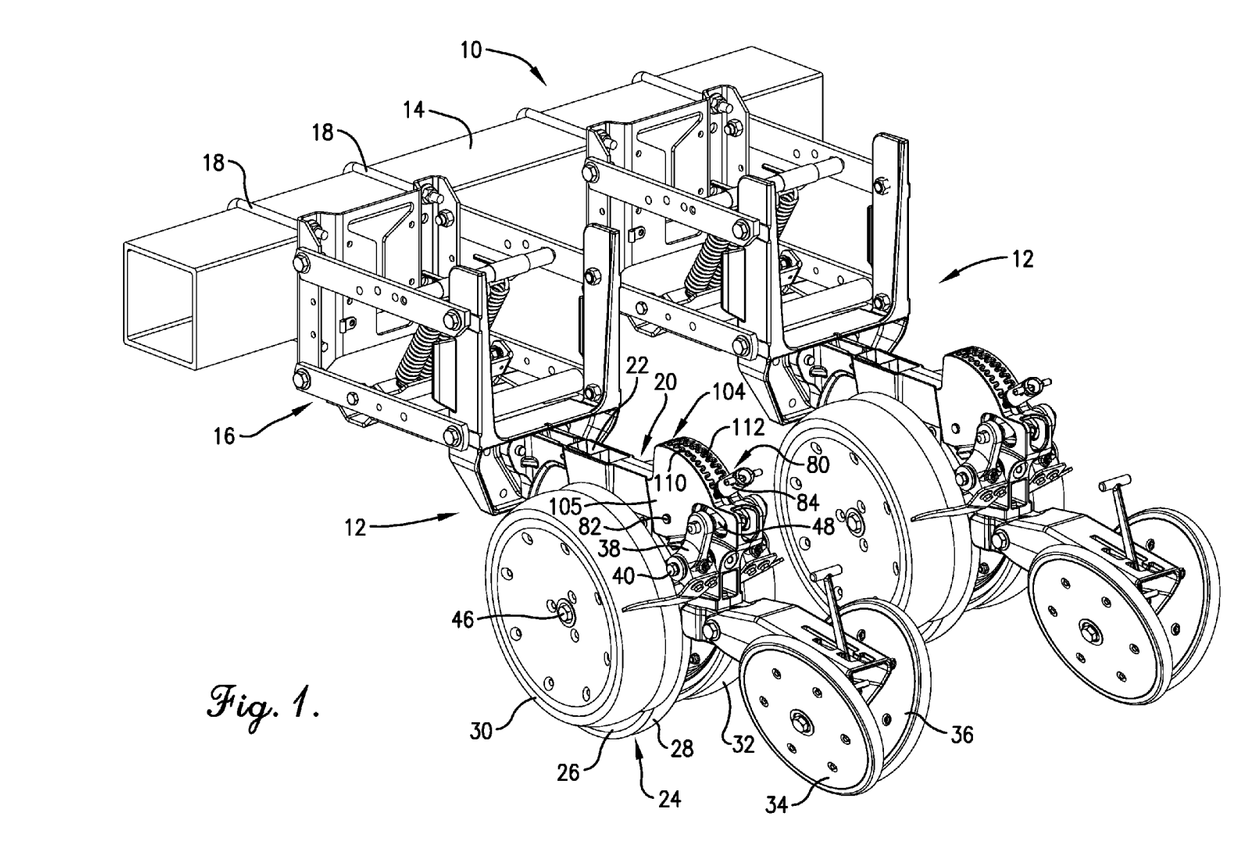
FIG. 1 is a left rear fragmentary isometric view of a planter employing multiple furrow opener units (only two being shown) that incorporate depth adjustment mechanism in accordance with the present invention.

FIG. 1 fragmentarily illustrates a planter 10 having a plurality of row units 12 attached to a tool bar 14 or other frame member of the machine. As well understood by those skilled in the art, planter 10 may be adapted for mounting on the three point hitch of a tractor or may comprise a pull-type implement with its own set of transport wheels (not shown).

Each row unit 12 includes some suitable means for attaching the unit to tool bar 14. In the illustrated embodiment, such attachment means comprise a four-bar linkage 16 and a pair of U-bolts 18. Each row unit 12 further broadly comprises a fore-and-aft frame 20 attached to and projecting rearwardly from linkage 16, the frame having a number of seed-planting components mounted thereon as hereinafter explained.

Figure 4:
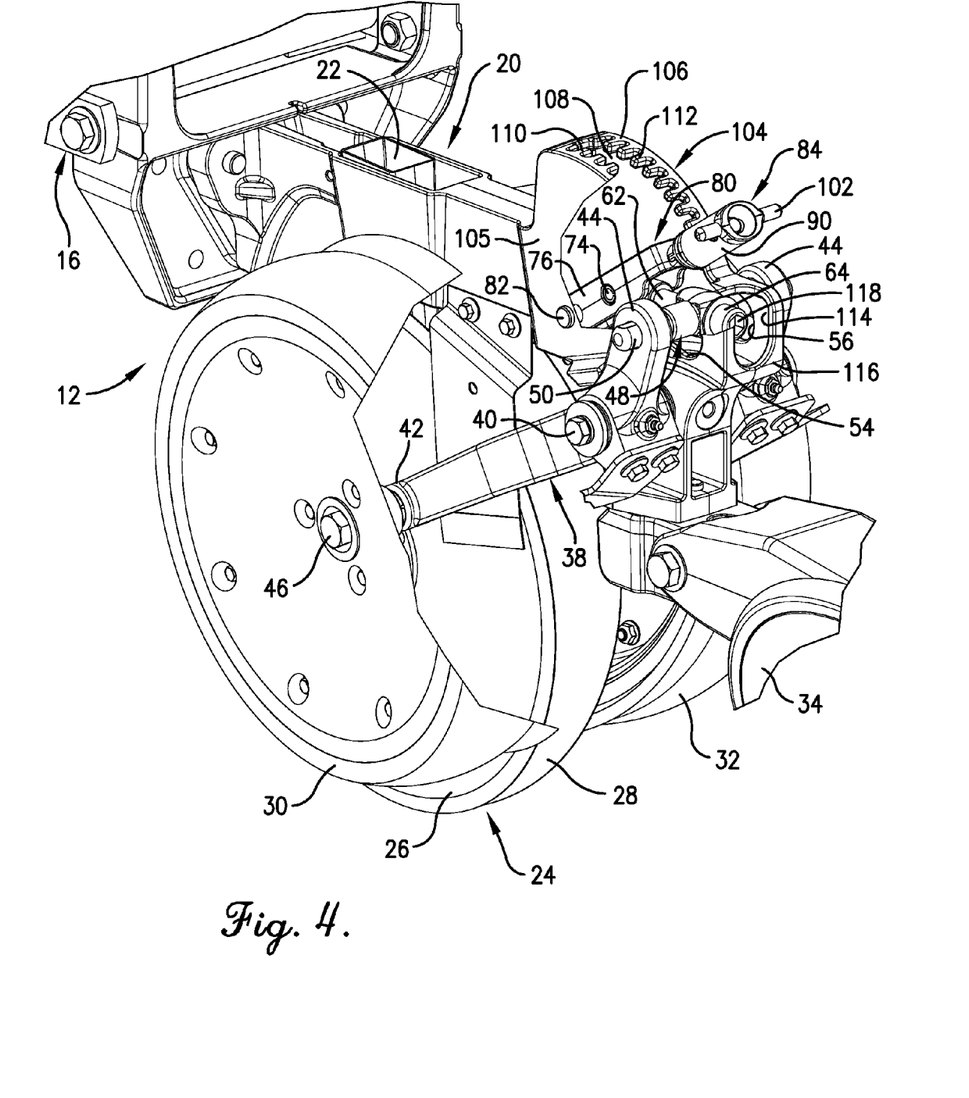
FIG. 4 is a fragmentary, left rear isometric view of the equalizing and depth adjustment mechanisms of the row unit with parts broken away to reveal details of construction.

Frame 20 carries a generally upright seed dispensing tube 22 that is visible in FIGS. 1 and 4 and is adapted for receiving seeds from suitable seed singulating meter (not shown) disposed above tube 22 on frame 20. The seed meter receives seeds from a source of supply, such as a seed box (not shown) also mounted on frame 20 above the meter. Seeds that are received by the meter from the seed box or other source of supply are singulated and dropped through seed tube 22 for deposit into the ground as planter 10 advances.

A suitable furrow opener 24 carried by frame 20 for opening a furrow in the soil for receiving seeds dropped through tube 22 may take a variety of different forms; in the illustrated embodiment, such furrow opener 24 takes the form of a double-disc opener having a pair of downwardly and slightly forwardly converging discs 26 and 28 rotatably mounted on frame 20. Seed tube 22 projects downwardly between discs 26, 28 and has a lower discharge end (not shown) facing generally rearwardly and downwardly to discharge the seeds into the furrow.

A pair of ground-engaging gauge wheels 30 and 32 are disposed on opposite sides of furrow opener 24 and are rotatably mounted on frame 20 to provide support for frame 20 and to limit the depth of penetration of furrow opener 24 into the ground. As frame 20 can swing up and down relative to tool bar 14 via the four-bar linkage 16, the downward movement is limited by gauge wheels 30, 32 as they roll along the ground during operation. In the illustrated embodiment, a pair of closing wheels 34, 36 are attached to the rear of frame 20 and function in a known manner to close the seed furrow after seeds have been deposited therein by tube 22.

Figure 2:
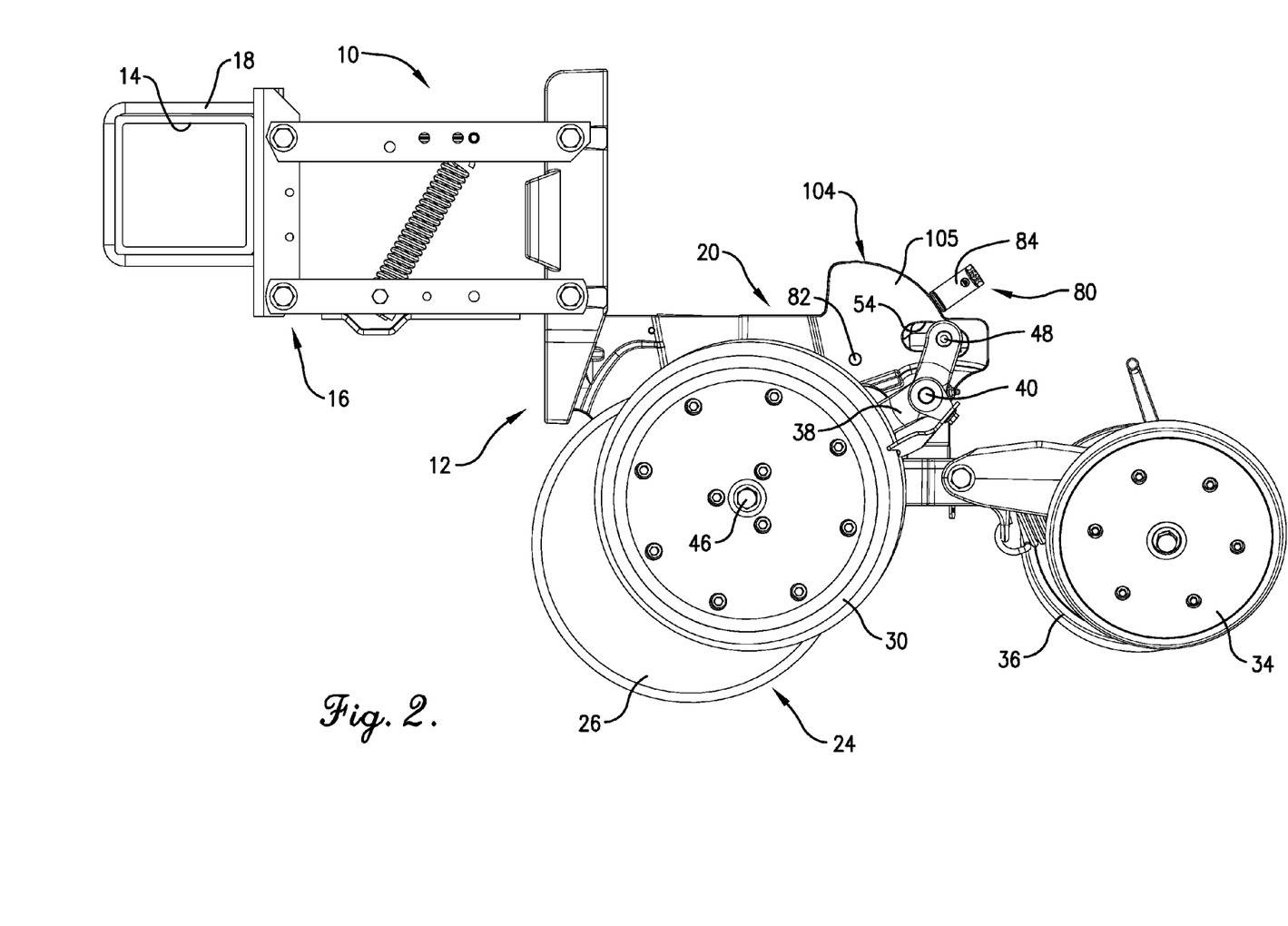
FIG. 2 is a left side elevational view of one of the row units illustrating the gauge wheels raised to an intermediate height to achieve a corresponding depth of penetration of the furrow opener of the unit.
Figure 3:
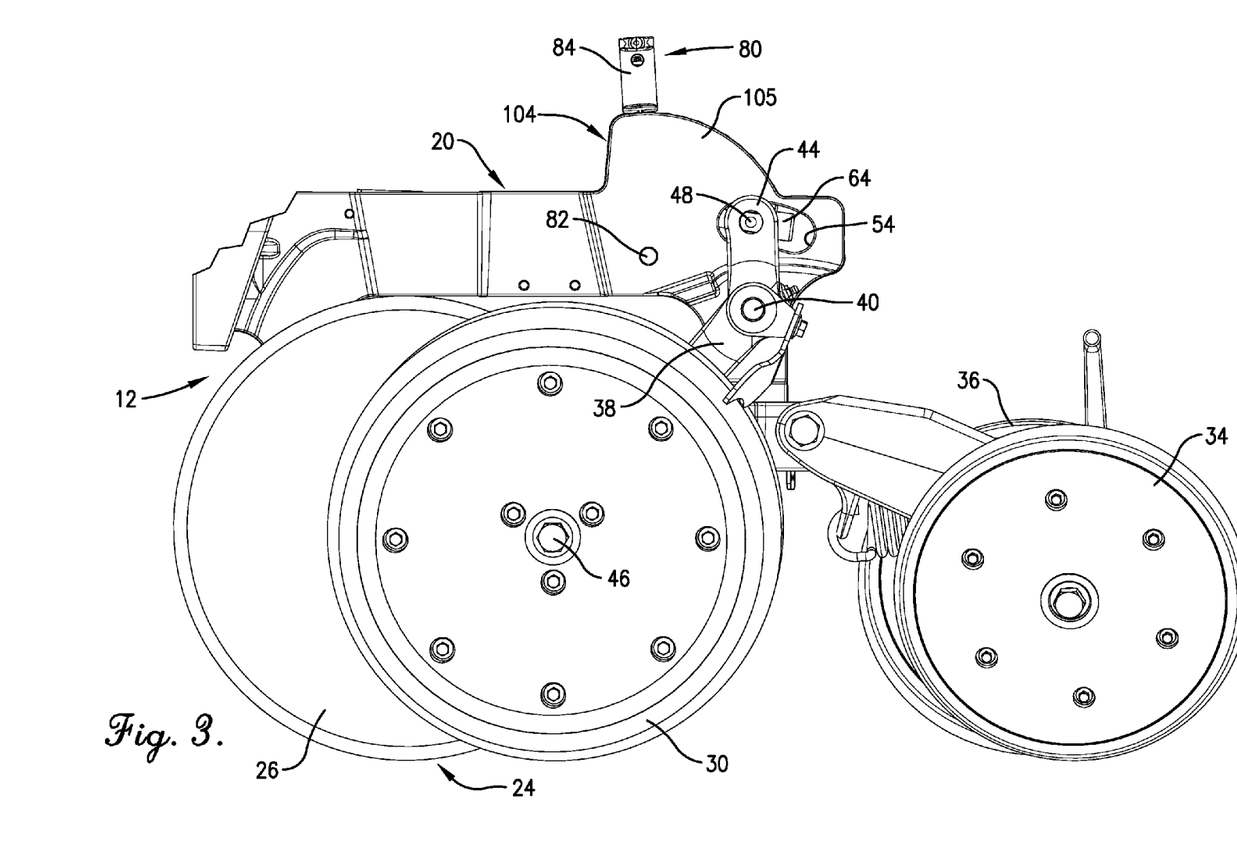
FIG. 3 is a similar, fragmentary side elevational view of the row unit of FIG. 2 illustrating the gauge wheels lowered from their FIG. 2 position resulting in a shallower running depth of the furrow opener.

The vertical position of gauge wheels 30, 32 relative to frame 20 and furrow opener 24 can be adjusted. FIGS. 2 and 3 illustrate two exemplary adjusted positions of gauge wheels 30, 32 so as to correspondingly adjust the depth of penetration of furrow opener 24. Although gauge wheels 30, 32 are designed to be height-adjusted in unison, they are also attached to frame 20 in such a manner that changes in terrain experienced by only one of the gauge wheels 30 or 32 does not result in lifting the entire frame 20 and furrow opener 24 by the total amount of rise experienced by that particular gauge wheel; instead, due to the equalizer mechanism hereinafter described, the effect is that the frame 20 and furrow opener 24 rise by approximately only one-half the amount experienced by the affected gauge wheel.

In this respect, it will be seen that each of the gauge wheels 30, 32 is attached to frame 20 by its own generally L-shaped wheel arm 38 pivotally attached to frame 20 for swinging movement about a transverse axis defined by a pivot 40. Pivot 40 is located intermediate the lower end 42 of each wheel arm 38 and the upper end 44 thereof so that gauge wheels 30, 32 generally move up and down when wheel arms 38 are adjusted about pivots 40. A pivot bolt 46 attaches each gauge wheel 30, 32 to lower end 42 of its wheel arm 38. Wheel arms 38 swing in upright, generally fore-and-aft planes.

Figure 7:
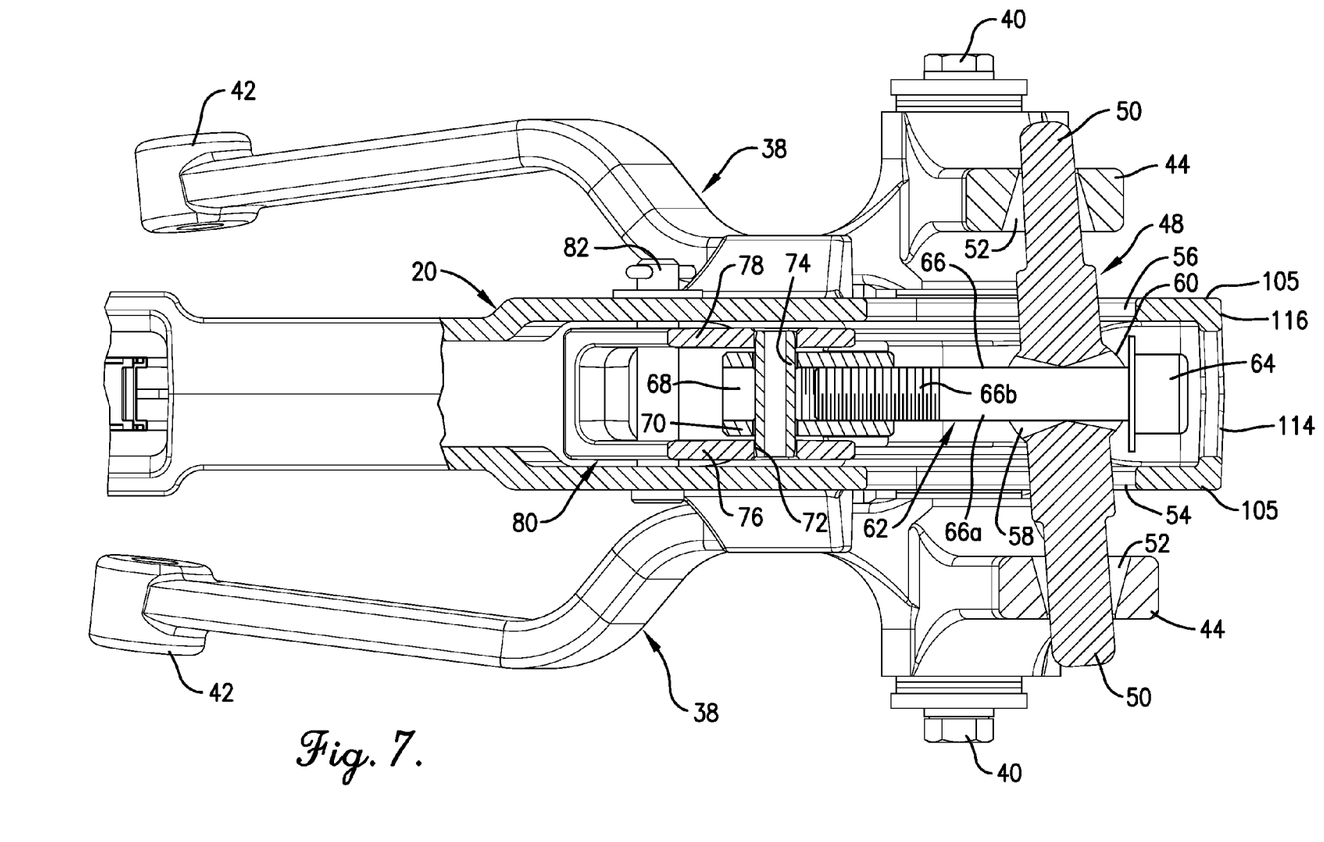
FIG. 7 is a generally horizontal cross-sectional view through the furrow opener taken substantially along line 7-7 of FIG. 6 and illustrating details of construction.

The upper ends 44 of wheel arms 38 are joined together by equalizer mechanism that includes a transverse equalizer bar 48 having a pair of reduced diameter opposite ends 50 that are loosely received within tapered holes 52 in the upper ends 44 of wheel arms 38 as illustrated in FIG. 7. The tapered nature of holes 52 allows bar ends 50 to be canted and skewed within holes 52 when one of the wheel arms 38 is displaced relative to the other during an equalizing action. Equalizer bar 48 passes through elongated slots 54 and 56 in opposite sidewalls of frame 20 to provide clearance for equalizer bar 48 in all adjusted positions of gauge wheels 30, 32 and during canting or skewing of equalizer bar 48.

As illustrated in FIG. 7, equalizer bar 48 has a fore-and-aft bore 58 therethrough that is generally hourglass-shaped, having front and rear portions that progressively increase in diameter as the front and rear extremities of equalizer bar 48 are approached. An enlarged central portion of equalizer bar 48 presents a rearwardly disposed, rearwardly facing abutment surface 60.

Passing through bore 58 is an adjustable length, two-component rigid link 62 having an enlarged head 64 that normally engages the rear abutment surface 60 of equalizer bar 48. One component of link 62 comprises an elongated shank 66 having an unthreaded portion 66a that is axially slidably received within bore 58, which is also unthreaded. The remaining portion of elongated shank 66 comprises a threaded portion 66b that is threadably received within the internally threaded bore 68 of the second component of link 62, namely, a cylindrical member 70. Member 70 and elongated shank 66 thus comprise two threadably interconnected components of link 62, the length of which may be slightly adjusted by rotating elongated shank 66 further into or out of member 70.

Member 70 has a crossbore 72 that receives a pivot 74 projecting outwardly beyond member 70 in opposite lateral directions. Opposite ends of pivot 74 are, in turn, fixed to a pair of laterally spaced apart legs 76, 78 of a depth adjustment lever 80 that is pivotally attached at its lower end to frame 20 by a transverse pivot 82. Thus, when depth adjustment lever 80 is shifted forwardly or rearwardly about pivot 82, link 62 swings wheel arms 38 about pivots 40 to correspondingly adjust gauge wheels 30 and 32 vertically relative to furrow opener 24.

Depth adjustment lever 80 has a handle 84 at its outer end that facilitates manipulation of depth adjustment lever 80. Furthermore, handle 84 is provided with means for releasably latching depth adjustment lever 80 in any selected one of a plurality of predetermined, releasably latched positions of adjustment about pivot 82 so as to releasably hold gauge wheels 30, 32 at corresponding height positions.

Figure 5:
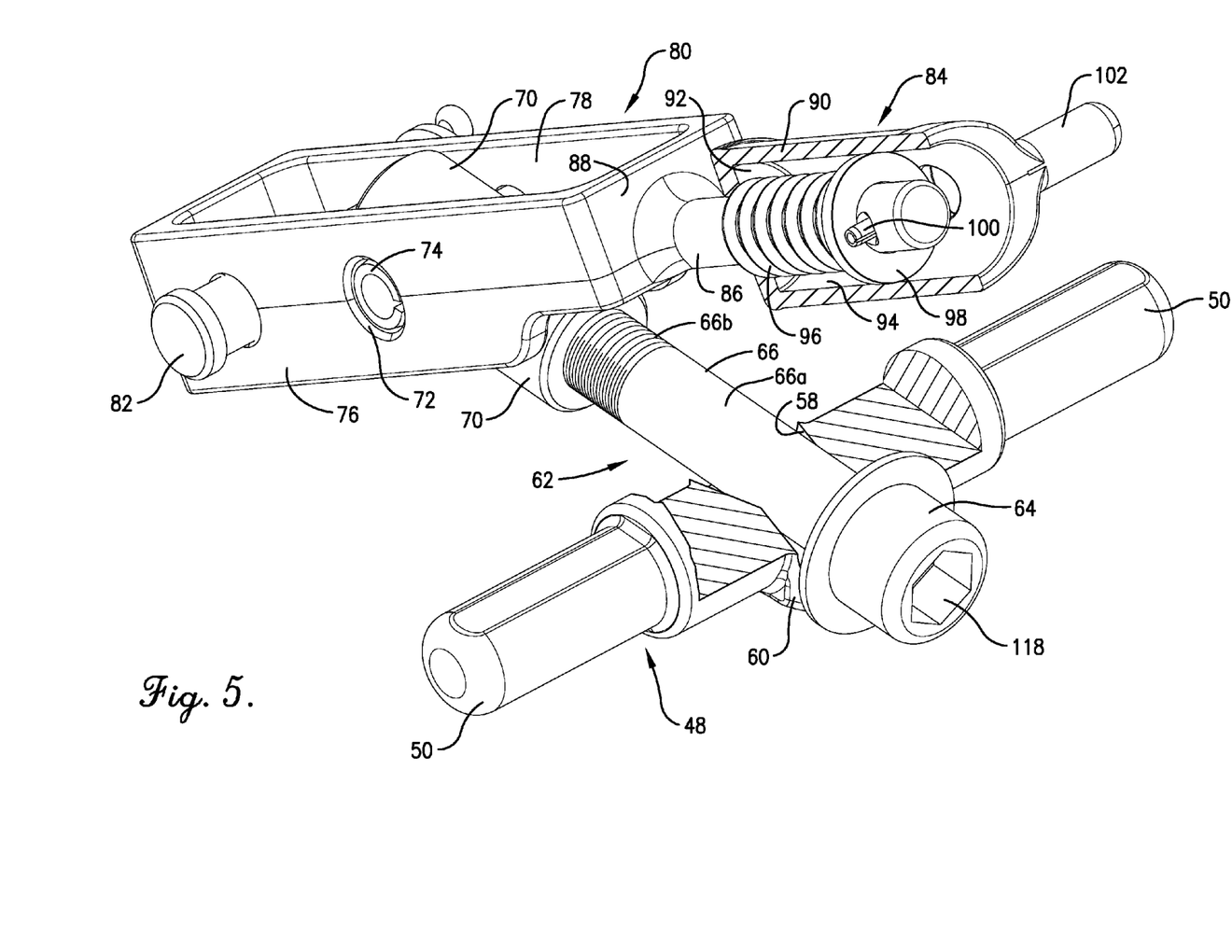
FIG. 5 is an enlarged, fragmentary isometric view of the depth adjustment lever and the manner in which it is linked to the gauge wheel equalizing mechanism.

In this regard, handle 84 includes a rigid, cylindrical stem 86 (FIG. 5) that is fixed to and projects upwardly and rearwardly from a transverse member 88 at the upper rear end of depth adjustment lever 80. A generally cylindrical cup 90 having a floor 92 and an internal chamber 94 receives stem 86 through a hole (not shown) in floor 92 and is axially shiftable along stem 86. A compression spring 96 encircles stem 86 within chamber 94 and is trapped between floor 92 and a washer 98 adjacent the free end of stem 86. Washer 98 is retained against escape by a cross pin 100. Thus, cup 90 of handle 84 is yieldably biased generally toward member 88 of depth adjustment lever 80 and may be pulled away from depth adjustment lever 80 along stem 86 using a finger-engaging cross bar 102 that spans cup 90 and projects laterally outwardly therefrom in opposite directions. Although not shown in the drawings, it is to be understood that cup 90 has a pair of diametrically opposed latching projections on the exterior of floor 92 that project in an axial direction therefrom toward member 88 of depth adjustment lever 80.

Frame 20 includes a hollow, generally quadrant-shaped housing 104 within which depth adjustment lever 80, link 62 and equalizer bar 48 are disposed and move. The aforementioned slots 54, 56 for clearing opposite ends of equalizer bar 48 during its fore-and-aft movement are disposed in opposite sidewalls 105 of housing 104. A convexly arcuate top wall 106 of housing 104 has a fore-and-aft extending clearance slot 108 that receives stem 86 to provide clearance therefor as depth adjustment lever 80 and handle 84 are moved fore-andaft. Two rows of notches 110 and 112 are disposed along opposite sides of slot 108 in open communication therewith for the purpose of releasably receiving the earlier-mentioned projections on bottom wall 92 of handle cup 90. Thus, coil spring 96 functions to yieldably bias cup 90 in a direction to engage the latching projections on the exterior of floor 92 with respective pairs of the notches 110, 112 to releasably latch depth adjustment lever 80 in any selected one of a plurality of predetermined, releasably latched positions of adjustment. By grasping handle 84 and pulling axially outwardly thereon against the resistance of spring 96, the latching projections may be temporarily withdrawn from notches 110, 112, allowing depth adjustment lever 80 to be shifted fore-and-aft as desired. Releasing handle 84 then allows coil spring 96 to reseat the latching projections within a selected pair of the notches 110, 112. Suitable indicia may be provided on top wall 106 adjacent the respective notches of rows 110, 112 to indicate a corresponding depth of penetration for furrow opener 24.

It will be seen, therefore, that major depth adjustment for furrow opener 24 is achieved by appropriate fore-and-aft manipulation of depth adjustment lever 80. When handle 84 is unlatched from notches 110, 112, fore-and-aft movement of depth adjustment lever 80 about pivot 82 using handle 84 results in corresponding swinging of wheel arms 38 about their pivots 40, to raise or lower gauge wheels 30, 32 relative to furrow opener 24, thus correspondingly adjusting the extent to which furrow opener 24 projects downwardly below the ground-engaging lower periphery of gauge wheels 30, 32. Movement of depth adjustment lever 80 is transmitted to wheel arms 38 by the link 62.

As noted above, the housing 104 may be provided with indica indicating the depth of penetration of furrow opener 24 corresponding to the respective notches 110, 112 so that, when handle 84 is locked into a selected pair of notches, furrow opener 24 is intended to penetrate to the depth indicated by the adjacent indicia. However, it is possible that due to manufacturing tolerances and wear of the various parts of the row unit, such as the discs 26, 28 of furrow opener 24, that the indicia at the various notches 110, 112 may not accurately correspond to the depth of penetration of furrow opener 24. Accordingly, and in accordance with the present invention, the length of link 62 may be appropriately adjusted as necessary to permit fine adjustment or calibration of the gauge wheels 30, 32. In other words, by appropriately rotating elongated shank 66 to thread the same into or out of member 70, the length of link 62 may be appropriately, finely varied to bring the depth of penetration of furrow opener 24 into correspondence with the indicia at notches 110, 112. In that manner, not only can each individual row unit 12 be calibrated so that the indicated depth on housing 104 corresponds with the actual depth of penetration of furrow opener 24, but all of the row units 12 along the tool beam 14 can likewise be brought into conformity with one another, assuring the operator that seeds are being properly deposited at the desired depth across the entire width of the planter. An access window 114 in a rear wall 116 of housing 104 provides access to the enlarged head 64 of link 62 for the purpose of adjustably rotating the same. In the illustrated embodiment, a hexagonally shaped socket 118 is provided in enlarged head 64 for receiving the operating end of a correspondingly shaped wrench (not shown).

Figure 6:
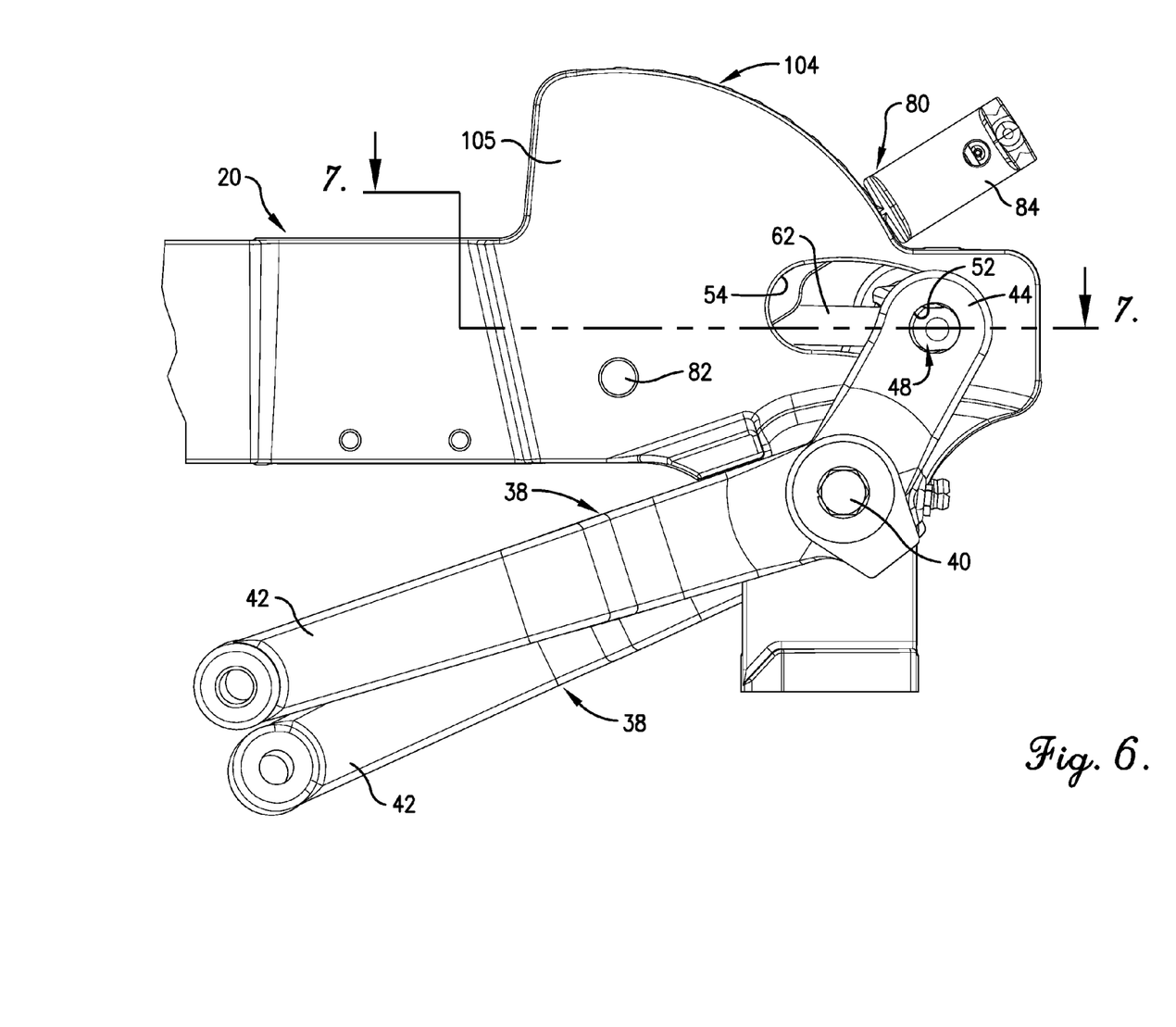
FIG. 6 is an enlarged, fragmentary side elevational view of the row unit illustrating one of the wheel arms raised slightly relative to the other during an equalizing action.

It will also be seen that the ability to calibrate the depth adjustment mechanism of each row unit 12 is achieved without interfering with the functioning of the equalizing mechanism of the furrow opener. Thus, while enlarged head 64 of link 62 normally bears against rear surface 60 of equalizer bar 48, when one of the wheel arms 38 is raised because its gauge wheel encounters a rise in the terrain (the left wheel arm 38 in FIGS. 6 and 7 for example), equalizer bar 48 is caused to twist generally in a counterclockwise direction viewing FIG. 7 as the upper end 44 of left arm 38 moves rearwardly. Consequently, the upper end 44 of right wheel arm 38 is caused to correspondingly move forwardly, rocking the front end 42 of right wheel arm 38 downwardly by an equal amount of the upward shifting of left wheel arm 38. This lowers right gauge wheel 32 by the same amount that left gauge wheel 30 is raised, thus reducing the amount that the frame 20 would otherwise be lifted by approximately one-half. As a consequence, more uniform depth of seed placement can be achieved than would otherwise be the case.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A planter row unit comprising:
    a frame;
    a furrow opener carried by said frame;
    a pair of wheel arms on opposite sides of said furrow opener,
    each of said wheel arms having an upper end, a lower end, and a pivotal attachment to said frame located intermediate said upper and lower ends for swinging movement about a generally horizontal, transverse axis;
    a ground-engaging gauge wheel rotatably attached to said lower end of each wheel arm respectively;
    a transverse equalizer bar interconnecting said upper ends of said wheel arms;
    a depth adjustment lever pivotally attached to said frame for swinging movement between any selected one of a plurality of predetermined, releasably latched positions; and
    a link interconnecting said depth adjustment lever and said equalizer bar for adjustably raising and lowering said gauge wheels relative to said furrow opener when said depth adjustment lever is released and shifted between said latched positions whereby to adjust the depth of said furrow opener,
    said link being selectively adjustable in length to permit depth calibration of said gauge wheels relative to said furrow opener when said depth adjustment lever is in a latched position.

2. A planter as claimed in claim 1,
    said link including a pair of threadably interconnected components such that rotation of one component relative to the other adjusts the overall length of said link.

3. A planter as claimed in claim 2,
    said one component comprising an elongated shank axially shiftable within a bore of said equalizer bar,
    said elongated shank having an enlarged head at one end of said elongated shank that bears against a rearwardly disposed surface on said equalizer bar,
    the other component being attached to said depth adjustment lever and threadably receiving said elongated shank.

4. A planter as claimed in claim 3,
    said elongated shank having a threaded portion threadably engaged with said other component, and an unthreaded portion axially slidably received within said bore of said equalizer bar.

5. A planter as claimed in claim 3,
said other component being pivotally attached to said depth adjustment lever.

6. A planter as claimed in claim 5,
said depth adjustment lever having a pair of laterally spaced apart legs and a transverse pivot spanning said legs,
said other component being carried on said pivot and having an internally threaded bore that threadably receives said elongated shank.

7. A planter as claimed in claim 6,
said elongated shank having a threaded portion threadably received within said threaded bore of said other component, and an unthreaded portion axially slidably received within said bore of said equalizer bar,
said bore of the equalizer bar being unthreaded.

* * * * *